(12) United States Patent
Lutnick

(10) Patent No.: US 11,367,129 B2
(45) Date of Patent: *Jun. 21, 2022

(54) METHOD AND APPARATUS FOR ASSOCIATING MENU INFORMATION

(71) Applicant: CFPH, LLC, New York, NY (US)

(72) Inventor: Howard W. Lutnick, New York, NY (US)

(*) Notice: Subject to any disclaimer, the term of this patent is extended or adjusted under 35 U.S.C. 154(b) by 28 days.

This patent is subject to a terminal disclaimer.

(21) Appl. No.: 16/670,167

(22) Filed: Oct. 31, 2019

(65) Prior Publication Data

US 2020/0098037 A1 Mar. 26, 2020

Related U.S. Application Data

(63) Continuation of application No. 15/481,028, filed on Apr. 6, 2017, now Pat. No. 10,497,052, which is a continuation of application No. 13/358,192, filed on Jan. 25, 2012, now Pat. No. 9,626,715, which is a continuation of application No. 12/947,108, filed on Nov. 16, 2010, now Pat. No. 8,108,420, which is a continuation of application No. 11/859,876, filed on Sep. 24, 2007, now Pat. No. 7,840,591.

(51) Int. Cl.

| | | |
|---|---|---|
| *G06Q 30/06* | (2012.01) |
| *G06F 16/9535* | (2019.01) |
| *G06Q 50/12* | (2012.01) |
| *G06F 40/106* | (2020.01) |
| *G06F 3/0482* | (2013.01) |
| *G06F 3/04847* | (2022.01) |
| *G06F 8/34* | (2018.01) |
| *G06F 8/38* | (2018.01) |
| *G06F 16/951* | (2019.01) |
| *G06F 3/0484* | (2022.01) |

(52) U.S. Cl.
CPC ....... *G06Q 30/0641* (2013.01); *G06F 3/0482* (2013.01); *G06F 3/04847* (2013.01); *G06F 8/34* (2013.01); *G06F 8/38* (2013.01); *G06F 16/9535* (2019.01); *G06F 40/106* (2020.01); *G06Q 30/06* (2013.01); *G06Q 30/0613* (2013.01); *G06Q 50/12* (2013.01); *G06F 3/0484* (2013.01); *G06F 16/951* (2019.01); *Y10S 707/948* (2013.01); *Y10S 707/961* (2013.01)

(58) Field of Classification Search
CPC .................................................. G06Q 30/0641
USPC ........................................................ 707/803
See application file for complete search history.

(56) References Cited

U.S. PATENT DOCUMENTS

| | | |
|---|---|---|
| 5,412,560 A | 5/1995 | Dennison |
| 5,991,739 A | 11/1999 | Cupps et al. |

(Continued)

OTHER PUBLICATIONS

U.S. Appl. No. 11/859,876, filed Sep. 2007, Lutnick.

(Continued)

*Primary Examiner* — Syling Yen

(57) ABSTRACT

Methods and Apparatus related to generating representations of information. The information may include menu information for merchants such as restaurants. Referring to menus, methods may include receiving potential information for a first menu, and receiving indications of associations of the information with the first menu and/or any number of additional menus. Information and/or associations may later be updated by a desired set of users.

14 Claims, 4 Drawing Sheets

(56) References Cited

U.S. PATENT DOCUMENTS

| | | | |
|---|---|---|---|
| 6,052,554 | A | 4/2000 | Hendricks et al. |
| 6,832,240 | B1 | 12/2004 | Dutta |
| 7,308,288 | B2 | 12/2007 | Pasquale et al. |
| 7,349,871 | B2 | 3/2008 | Labrou et al. |
| 7,363,645 | B1 | 4/2008 | Hendricks |
| 7,840,591 | B2 | 11/2010 | Lutnick |
| 7,870,166 | B2 | 1/2011 | Lutnick |
| 8,108,420 | B2 | 1/2012 | Lutnick |
| 8,190,483 | B2 | 5/2012 | Woycik et al. |
| 8,484,240 | B2 | 7/2013 | Lutnick et al. |
| 2002/0013734 | A1 | 1/2002 | Bueno |
| 2002/0055887 | A1 | 5/2002 | Seguin |
| 2002/0124257 | A1 | 9/2002 | Ismagilov |
| 2003/0109310 | A1 | 6/2003 | Heaton et al. |
| 2003/0154135 | A1 | 8/2003 | Covington et al. |
| 2004/0044578 | A1 | 3/2004 | Kim et al. |
| 2004/0091843 | A1 | 5/2004 | Albro et al. |
| 2004/0139031 | A1 | 7/2004 | Amaitis et al. |
| 2004/0158494 | A1* | 8/2004 | Suthar .................. G06Q 30/06 705/15 |
| 2005/0132305 | A1 | 6/2005 | Guichard et al. |
| 2005/0182380 | A1 | 8/2005 | Fujioka et al. |
| 2005/0182680 | A1 | 8/2005 | Jones et al. |
| 2005/0240434 | A1 | 10/2005 | Wooten et al. |
| 2005/0267787 | A1 | 12/2005 | Rose et al. |
| 2006/0069620 | A1* | 3/2006 | Sutcliffe ............... G06Q 30/06 705/15 |
| 2006/0090966 | A1 | 5/2006 | Sutcliffe |
| 2006/0136309 | A1 | 6/2006 | Horn et al. |
| 2006/0218039 | A1 | 9/2006 | Johnson |
| 2007/0038727 | A1 | 2/2007 | Bailey |
| 2007/0106565 | A1 | 5/2007 | Coelho |
| 2007/0214052 | A1 | 9/2007 | Kao |
| 2007/0265935 | A1 | 11/2007 | Woycik |
| 2009/0083223 | A1 | 3/2009 | Lutnick |
| 2009/0083324 | A1 | 3/2009 | Lutnick |
| 2010/0211489 | A1* | 8/2010 | Zhang .................. G06Q 30/04 705/34 |
| 2011/0060665 | A1 | 3/2011 | Lutnick |
| 2011/0191194 | A1 | 8/2011 | Lutnick et al. |
| 2012/0123878 | A1 | 6/2012 | Lutnick |
| 2014/0019272 | A1 | 1/2014 | Lutnick |
| 2017/0206595 | A1 | 7/2017 | Lutnick et al. |

OTHER PUBLICATIONS

U.S. Appl. No. 11/859,886, filed Sep. 2007, Lutnick.
U.S. Appl. No. 12/855,023, filed Aug. 2010, Lutnick, et al.
U.S. Appl. No. 12/947,108, filed Nov. 2010, Lutnick.
O'Sullivan, Patricia J. et al., "Blueprint for a National Environmental Information Exchange Network," report to the State /EPA Information Management Workgroup, published Oct. 30, 2000 (retrieved on Feb. 25, 2008) retrieved from the Internet: <URL: http://www.epa.gov/oei/imwg/pdf/final_blueprint.pdf>.
English, David, "Site Selection—The Three Rules of Retailing, Location, Coation, and Location—Extent to E-Commerce," Computer Shopper, Mar. 1, 2000, p. 1-4.
USPTO Office Action for U.S. Appl. No. 11/859,876, dated Feb. 16, 2010 (17 pages).
USPTO Examiner Interview Summary for U.S. Appl. No. 11/859,876, dated Apr. 22, 2010 (3 pages).
USPTO Office Action for U.S. Appl. No. 11/859,886, dated Mar. 1, 2010 (16 pages).
USPTO Examiner Interview Summary for U.S. Appl. No. 11/859,886, dated Apr. 19, 2010 (3 pages).
USPTO Examiner Interview Summary for U.S. Appl. No. 11/859,886, dated Apr. 22, 2010 (3 pages).
Notification of Transmittal of the International Search Report and Written Opinion of International Application No. PCT/US07/79281, dated Apr. 25, 2008 (11 pages).
International Preliminary Report on Patentability for International Application No. PCT/US07/79281, dated Mar. 24, 2010 (9 pages).
USPTO Notice of Allowance and Fees Due and Examiner Interview Summary for U.S. Appl. No. 11/859,876, dated Sep. 1, 2010 (8 pages).
USPTO Notice of Allowance and Fees Due and Examiner Interview Summary for U.S. Appl. No. 11/859,886, dated Sep. 17, 2010 (15 pages).
USPTO Supplemental Notice of Allowance and Fees Due and Examiner Interview Summary for U.S. Appl. No. 11/859,876, dated Oct. 25, 2010 (2 pages).
USPTO Office Action for U.S. Appl. No. 12/947,108, dated Jan. 13, 2011 (24 pages).
USPTO Examiner Interview Summary for U.S. Appl. No. 12/947,108, dated Feb. 23, 2011 (4 pages).
USPTO Notice of Allowance and Fees Due and Examiner Interview Summary for U.S. Appl. No. 12/947,108, dated Sep. 22, 2011 (16 pages).
USPTO Office Action for U.S. Appl. No. 13/358,192, dated May 8, 2013 (21 pages).
USPTO Office Action for U.S. Appl. No. 12/855,023, dated Jun. 8, 2012 (34 pages).
USPTO Notice of Allowance and Fees due for U.S. Appl. No. 12/855,023, dated Mar. 19, 2013 (10 pages).

* cited by examiner

201

| MENU | IMAGE | CAT. | DESC. | HOURS | DELIVERY | DRINK PACKAGES |
|---|---|---|---|---|---|---|
| MENU1 | IMG1 | Mexican | DSCR1 | | None | None |
| MENU2 | Image2.jpg | Chinese | | 9-9; All | BND1 | None |
| MENU3 | Image2.jpg | Mexican | "The best" DSCR1 "in town." | 24 hours | BND1 | STDCOKE |

203

| IMG1 | IMAGE1.JPG |
|---|---|
| DSCR1 | Mexican food |
| BND1 | 1st st, 2nd ave, 4st, 3rd ave |
| STDCOKE | Coco-Cola Classic; Sprite; Diet Coke |
| Default.hours | 12-5;M-S |

FIGURE 2

METHOD AND APPARATUS FOR ASSOCIATING MENU INFORMATION

CROSS-REFERENCE TO RELATED APPLICATIONS

The present application is continuation of U.S. patent application Ser. No. 15/481,028 filed on Apr. 6, 2017, which is continuation of U.S. patent application Ser. No. 13/358,192 filed on Jan. 25, 2012 (now U.S. Pat. No. 9,626,715), which is a continuation of U.S. patent application Ser. No. 12/947,108, filed on Nov. 16, 2010 (now U.S. Pat. No. 8,108,420 issued on Jan. 31, 2012), which is a continuation of U.S. patent application Ser. No. 11/859,876, filed on Sep. 24, 2007 (now U.S. Pat. No. 7,840,591 issued on Nov. 23, 2010), all of which are incorporated by reference herein in their entireties.

BRIEF DESCRIPTION OF THE DRAWINGS

The accompanying drawings are not intended to be drawn to scale. In the drawings, each identical or similar component that is illustrated in various figures is represented by a like numeral. For purposes of clarity, not every component may be labeled or act identified in every drawing. In the drawings:

FIG. 2 shows an example set of database tables that may be maintained in some embodiments of the present invention;

DETAILED DESCRIPTION

Terms

Figure 1:
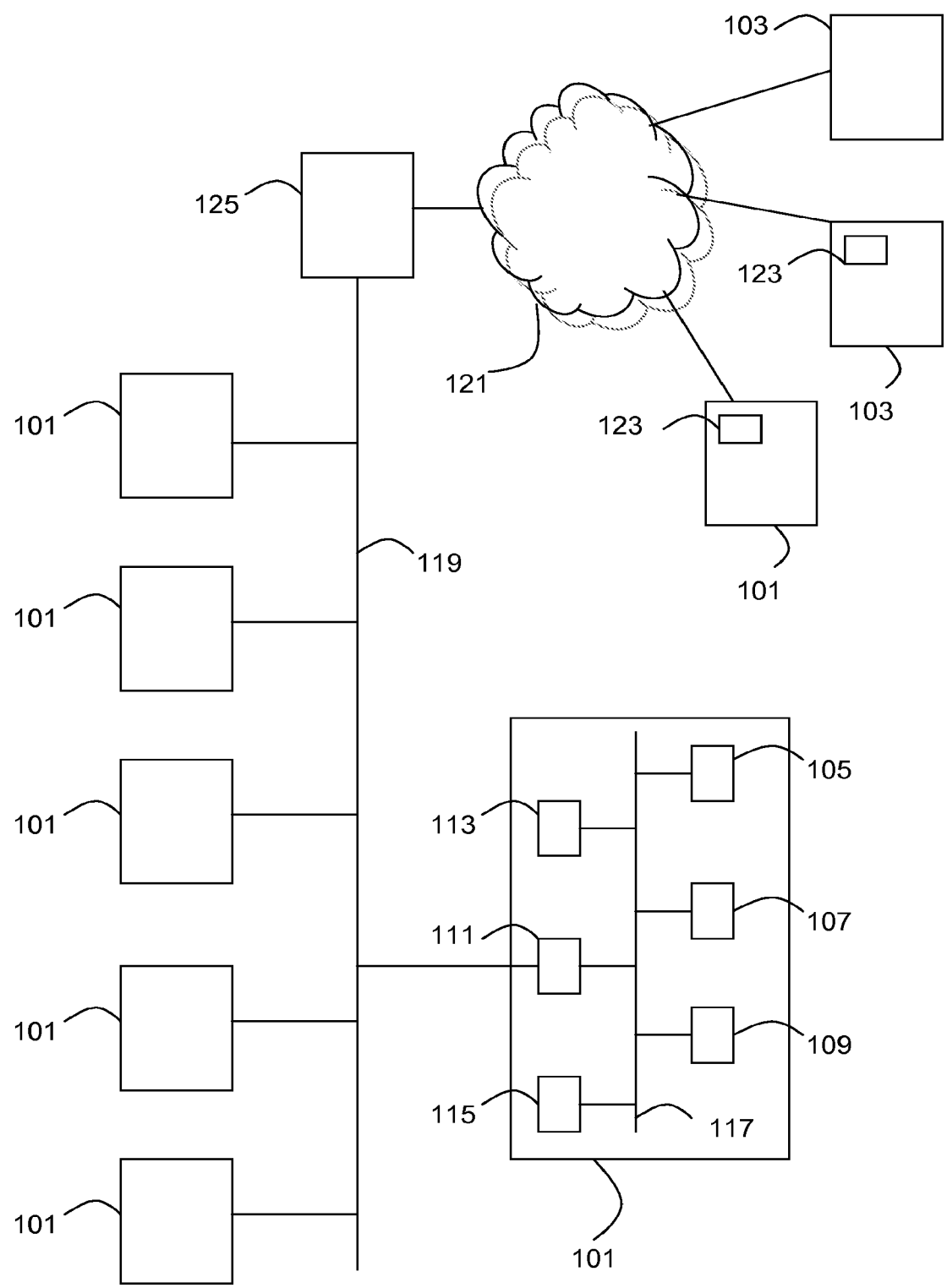
FIG. 1 shows a computer system architecture that may be used to perform one or more acts in accordance with some embodiments of the present invention.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising", "having", "containing", "involving", and variations thereof mean "including but not limited to", unless expressly specified otherwise. The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on". Similarly, the phrase "based on" does not mean "based on the entirety of", "based on all of", or variations thereon, unless expressly specified otherwise.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like. The term "determining" does not imply that mathematical processing must be performed, and does not imply that numerical methods must be used, and does not imply that an algorithm or process is used. The term "determining" does not imply that any particular device must be used. For example, a computer need not necessarily perform the determining.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the present invention", unless expressly specified otherwise.

The term "electronic message" and variations thereof used herein should be understood to mean any electronic representation of information. For example an HTTP message, an XMLHTTP request, an SMS message, an MMS message, a database message (e.g., SQL message) or any other series of electrical signals that represent information may be considered an electronic message. An electronic message does not include information identifying a source and/or destination such as the information typically present in a TCP/IP packet header. Rather, the electronic message should be considered the body/content of such a packet.

The terms "representation" and "indication" of a thing and variations thereof used herein in reference to a thing should be understood to refer to any indication of at least a portion and/or characteristic of the thing. An indication of information, for example, may include any indication of at least a portion of the information. In some embodiments, the information may be determined by a person or computing device from the indication of the information. In some example implementations, an indication may include a copy of the information in any of a variety of formats, compressions, and/or encryptions. In another example implementation, an indication may include an index or other identifier, such as a position in a list, an ID number, or a database key. An indication of a thing may be in the same or different medium as an original thing. For example, a number "1" may indicate a sound, a color, a menu item, or any other thing depending, e.g., on the configuration of a computing system configured to interpret the number. In some implementations, an indication may be divided into a plurality of portions, such as a plurality of electronic messages being transmitted from one location to another. In some implementations, multiple indications may be combined into a single message.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers (e.g., "a plurality of first widgets" indicates two or more widgets that are distinct from other widgets). For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are not Limiting

Neither the Title (set forth at the beginning of the first page of the present application) nor the Abstract (set forth at the end of the present application) is to be taken as limiting in any way as the scope of the present invention. An Abstract has been included in this application merely because an Abstract of not more than 150 words is required under 37 C.F.R. § 1.72(b).

The title of the present application and headings of sections provided in the present application are for convenience only, and are not to be taken as limiting the disclosure in any way.

Numerous embodiments are presented for illustrative purposes only. The described embodiments are not, and are not intended to be, limiting in any sense. One of ordinary skill in the art will recognize that the present invention may be practiced with various modifications and alterations, such as structural, logical, software, and electrical modifications. Although particular features of the present invention may be described with reference to one or more particular embodiments and/or drawings, it should be understood that such features are not limited to usage in the one or more particular embodiments or drawings with reference to which they are described, unless expressly specified otherwise.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention. Unless otherwise specified explicitly, no component/feature is essential or required.

Although process acts, algorithms or the like may be described in a particular sequential order, such processes may be configured to work in different orders. In other words, any sequence or order of acts that may be explicitly described does not necessarily indicate a requirement that the acts be performed in that order. The acts of processes described herein may be performed in any order. Further, some acts may be performed simultaneously despite being described or implied as occurring non-simultaneously (e.g., because one act is described after the other act). Further more, acts which are described as separate may be performed as a single act in some embodiments. Moreover, the illustration of a process by its depiction in a drawing does not imply that the illustrated process is exclusive of other variations and modifications thereto, does not imply that the illustrated process or any of its acts are necessary to the present invention, and does not imply that the illustrated process is preferred.

Although a process may be described as including a plurality of acts, that does not imply that all or any of the acts are preferred, essential or required. Various other embodiments within the scope of the present invention may include other processes that omit some or all of the described acts. Unless otherwise specified explicitly, no act is essential or required.

Although a process or product may be described singly or without reference to other processes or products, in some embodiments the process or product may interact with other processes or products. For example, such interaction may include linking one business model to another business model. Such interaction may be provided to enhance the flexibility or desirability of the process.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. Also, an enumerated list of items (which may or may not be numbered) does not imply that any or all of the items are equivalent to each other or readily substituted for each other.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim. The preambles of the claims that follow recite purposes, benefits and possible uses of the claimed invention only and do not limit the claimed invention.

Computing

It should be appreciated that the various processes described herein may be implemented by, e.g., appropriately programmed computer systems, e.g., general purpose computers 101 and/or computing devices 103, such as those illustrated in FIG. 1. A computing device 103 may include a specialized or general purpose computing device such as a cellular phone, a personal digital assistant, and/or any other portable or non-portable computing system that is not a general purpose computer.

A "processor" 105 means one or more microprocessors, central processing units (CPUs), computing devices, microcontrollers, digital signal processors, application specific integrated circuits, or like devices or any combination thereof. A processor may include an Intel® Pentium®, Centrino®, and/or Core® processor. Typically, a processor 105 will receive instructions (e.g., from a memory or like device), and execute those instructions, thereby performing one or more processes defined by those instructions.

Thus a description of a process is likewise a description of an apparatus for performing the process. The apparatus that performs the process may include, e.g., a processor 105 and those input devices and/or output devices (e.g., a keyboard 107, mouse, trackball, microphone, touch screen, printing device, display screen 109, speaker, network interface 111) that are appropriate to perform the process.

Further, programs (i.e., collections of instructions) that implement such methods (as well as other types of data) may be stored and transmitted using a variety of media (e.g., machine-readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

In some embodiments, processor 105 may execute an operating system which may include, for example, the Windows-based operating systems (e.g., Windows NT, Windows 2000 (Windows ME), Windows XP, Windows Vista) available from the Microsoft Corporation, MAC OS System X operating system available from Apple, one or more of the Linux-based operating system distributions (e.g., the Enterprise Linux operating system available from Red Hat, Inc.), the Solaris operating system available from Sun Microsystems, or UNIX operating systems available from various sources. Many other operating systems may be used, and the invention is not limited to any particular operating system.

The processor and operating system together may define a computer platform for which programs stored on a machine-readable medium may be written in various programming languages, including an object-oriented programming language, such as SmallTalk, Java, C++, Ada, Python, or C # (C-Sharp), functional programming languages, scripting programming languages such as JavaScript, and/or logical programming languages. Various aspects of the invention may be implemented in a non-programmed environment (e.g., documents created in HTML, XML or other format that, when viewed in a window of a browser program, render aspects of a GUI or perform other functions). Some implementations of the present invention may be implemented using a plurality of programming languages and techniques known collectively as AJAX to provide a user with an interactive web-based user interface.

Various embodiments of the present invention may include a network environment including one or more computing systems (e.g., general purpose computers 101, other computing devices 103) in communication through one or more communication networks (e.g., a LAN 119, the Internet 121). The computer systems may communicate directly or indirectly, via any wired or wireless medium (e.g., the Internet 121, LAN 119, WAN or Ethernet, Token Ring, a telephone line, a cable line, a radio channel, an optical communications line, commercial on-line service providers, bulletin board systems, a satellite communications link, cellular telephone networks, a WI-FI network, a Bluetooth communication link, a combination of any of the above).

Various aspects of the invention (e.g., program elements stored on machine-readable media and executable by one or more processors) may be distributed among one or more computer systems configured to provide a service to one or more client computer systems. For example, in some embodiments, a plurality of computing systems may be organized as a central authority connected to a LAN or other communication network. These computing systems may receive requests and other information from remote computing systems through the Internet 121.

In some embodiments of the present invention, one or more computer systems may act as one or more database servers. The database server may respond to database requests such as structured query language (SQL) queries by providing access to a database (e.g., searching of the database, writing to the database). The database server may maintain one or more database tables having information stored therein to facilitate the operation of some embodiments.

For example, FIG. 2 illustrates one exemplary set of database tables that may be used in some implementations of the present invention. It should be recognized that the invention is not limited to any particular set of database tables or even a single database table.

As illustrated in FIG. 2, in some implementations, one database table may include an item table 201. The item table 201 may include an entry for each item (e.g., each menu) maintained by a computer system performing a process in accordance with some embodiments of the present invention. The item table 201 may include database elements (i.e., columns) for each type of information that may be entered about an item. As illustrated, some types of information may include images, categories, descriptions, hours, delivery boundaries, and soft drink packages. Such information is discussed in more detail below and is not limited to these examples.

As illustrated in FIG. 2, in some implementations, one databases table may include an information table 203. The information table 203 may associate content of information with a label that may be used to refer to that content. For example, the information label IMG1 may is associated with the image file IMAGE1.JPG in the illustrated example of FIG. 2.

The combination of the item table 201 and the information table 203 may be used to determine a set of information associated with each item entry in the item table 201. For example, the description associated with MENU3 may be determined by referencing the description element to determine the content "The best" DSCR1 "in town." The label DSCR1 may be determined by referencing the information table 203 to determine the value "Mexican food". These may be combined to determine the content of the description of MENU3 as "The best Mexican food in town."

In some embodiments, default values for content may also be determined in a similar manner. For example, if content of an entry is not filled with a value in the item table 201, the information table 203 may be searched for an appropriate default content value. As illustrated, the value of hours content for MENU1 may be determined to be "12-5;M-S" by performing such a search to find the default hours information.

Although the content of the database tables are illustrated as simple text or image files, in other implementations, the content may include portions of HTML or other content. HTML may be arranged to generate a webpage or other interface layout incorporating the desired content, for example according to an interface template such as an XML document.

It should be recognized that while in this example illustration, database labels are used to reference from one entry into another in database tables, in other embodiments, any other method of referencing stored information may be used. For example, functions that determine which information to access may be used in some implementations, XML tags defining a general interface layout may be used in some implementation, and any other method desired may be used in some implementations.

It should further be understood that in some embodiments information within a content entry may have further information references to other information entries. For example, in some implementations, an item entry may correspond to menu items available for sale. An information item may include a list of menu items. That list of menu items may reference individual other information content in the information table 203 that provide descriptions, images, prices, and/or any other information desired about some or all of the menu items. Such nesting of information may include any number of desired levels.

In some embodiments, a maintained database table may include an association table 205. The association table 205 may include information related to the associations between content in the item table 201 and content in the information table 203. For example, the association table's first entry indicates that the content of the description element of the MENU1 entry of the item table 201 is associated with the information item DSCR1 of the information table 203. Such an association table 205 may be useful in some implementation, though may not be needed in other implementations.

It should be recognized that content of information and associations between items and information may easily be changed by the example database tables or any other set of database tables. In some implementations, content of entries in the item table 201 may act as pointers to content in the information table 203 allowing a single piece of content in the information table to be referenced by multiple item entries. Such pointers allow a single piece of information to be edited for all items associated with that information, as discussed below. In some implementations, rather than multiple pointers to the same content, each time information is to be associated with a new item, a new copy of the information may be made in the information table, and each pointer from an item to information may point to a unique copy of the information. Such copying may allow information to be customized individually for each item as discussed below.

Aside from database servers, in some embodiments, one or more computer systems may act as a web server. A web server may be configured to respond to network requests (e.g., HTTP messages, XMLHTTP requests) from web browsers executed by remote computer systems. For example, a web browser 123 executed by a computing system may direct an HTTP message through the Internet 121 to an edge routing device 125 connected to the LAN 119. The edge routing device 125 may be configured to direct the HTTP message to the web server through the LAN 119. The web server may provide a response (e.g., an HTML document) to the web browser 123 through the edge routing device 125 and Internet 121. The web server may be configured to communicate with other computer systems (e.g., a database server) to generate responses to such a received request.

In some embodiments, a server computer/centralized authority may not be necessary or desirable. For example, the present invention may, in an embodiment, be practiced on one or more computing devices without a central authority. In such an embodiment, any functions described herein as performed by a server or data described as stored on a general purpose computer may instead be performed by or stored on one or more such computing devices.

The term "machine-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks 113 and other persistent memory. Volatile media include dynamic random access memory 115 (DRAM), which typically constitutes the main memory of a computer system. Transmission media include coaxial cables, copper wire and fiber optics, including the wires that comprise a system bus 117 coupled to the processor. Transmission media may include or convey acoustic waves, light waves and electromagnetic emissions, such as those generated during radio frequency (RF) and infrared (IR) data communications. Common forms of machine-readable media include, for example, a floppy disk, a flexible disk, a hard disk, a magnetic tape, any other magnetic medium, a CD-ROM, a DVD, any other optical medium, punch cards, a paper tape, any other physical medium with patterns of holes, a RAM, a PROM, an EPROM, a FLASH-EEPROM, any other memory chip or cartridge, a carrier wave, or any other medium from which a computer system can read.

Various forms of machine-readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a machine-readable medium storing a program for performing the process. The machine-readable medium can store (in any appropriate format) those program elements that are appropriate to perform the process.

Where a process is described, in some embodiments the process may operate without any user intervention. In other embodiments, the process includes some human intervention (e.g., an act is performed by or with the assistance of a human).

Just as the description of various acts in a process does not indicate that all the described acts are required, embodiments of an apparatus may include one or more computer systems operable to perform some (but not necessarily all) of the described process.

Likewise, just as the description of various acts in a process does not indicate that all the described acts are required, embodiments of a machine-readable medium storing a program or data structure include a machine-readable medium storing a program that, when executed, can cause one or more processors to perform some (but not necessarily all) of the described process.

Where databases are described, it will be understood by one of ordinary skill in the art that (i) alternative database structures to those described may be readily employed, and (ii) other memory structures besides databases may be readily employed. Any descriptions of any sample databases presented herein are illustrative arrangements for stored representations of information. Any number of other arrangements may be employed besides those suggested herein. Further, any database format (including relational databases, object-based models and/or distributed databases) may be used to store and manipulate the data types described herein. Likewise, object methods or behaviors of a database may be used to implement processes described herein. In addition, the databases may, in a known manner, be stored locally or remotely from a device which accesses data in such a database.

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

35 U.S.C. § 112, Paragraph 6

In a claim, a limitation of the claim which includes the phrase "means for" or the phrase "step for" means that 35 U.S.C. § 112, paragraph 6, applies to that limitation. In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s). With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation by Reference

Any patent, patent application or other document referred to herein is incorporated by reference into this patent application as part of the present disclosure, but only for purposes of written description in accordance with 35 U.S.C. § 112, paragraph 1 and enablement in accordance with 35 U.S.C. § 112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

EXEMPLARY EMBODIMENTS

Methods and apparatus related to generating representations' of information are disclosed herein. In particular, some embodiments relate to generating representations of menus. It is recognized, in one aspect of the present invention, that use of information from one source may be used for a plurality of purposes. For example, a single source may provide information regarding a first menu. The provided information may then be reused for a plurality of additional menus. It is also recognized that a plurality of sources may contribute to the generation of a single representation of information (e.g., by contributing small pieces of information). For example, sources may provide information and/or indicate associations between information and one or more menus. In some embodiments, the single source or other sources may indicate associates between the information and the plurality of additional menus. It is recognized that such systems and methods may be useful, for example, in distributing the work of generating menus of other information.

Figure 3:
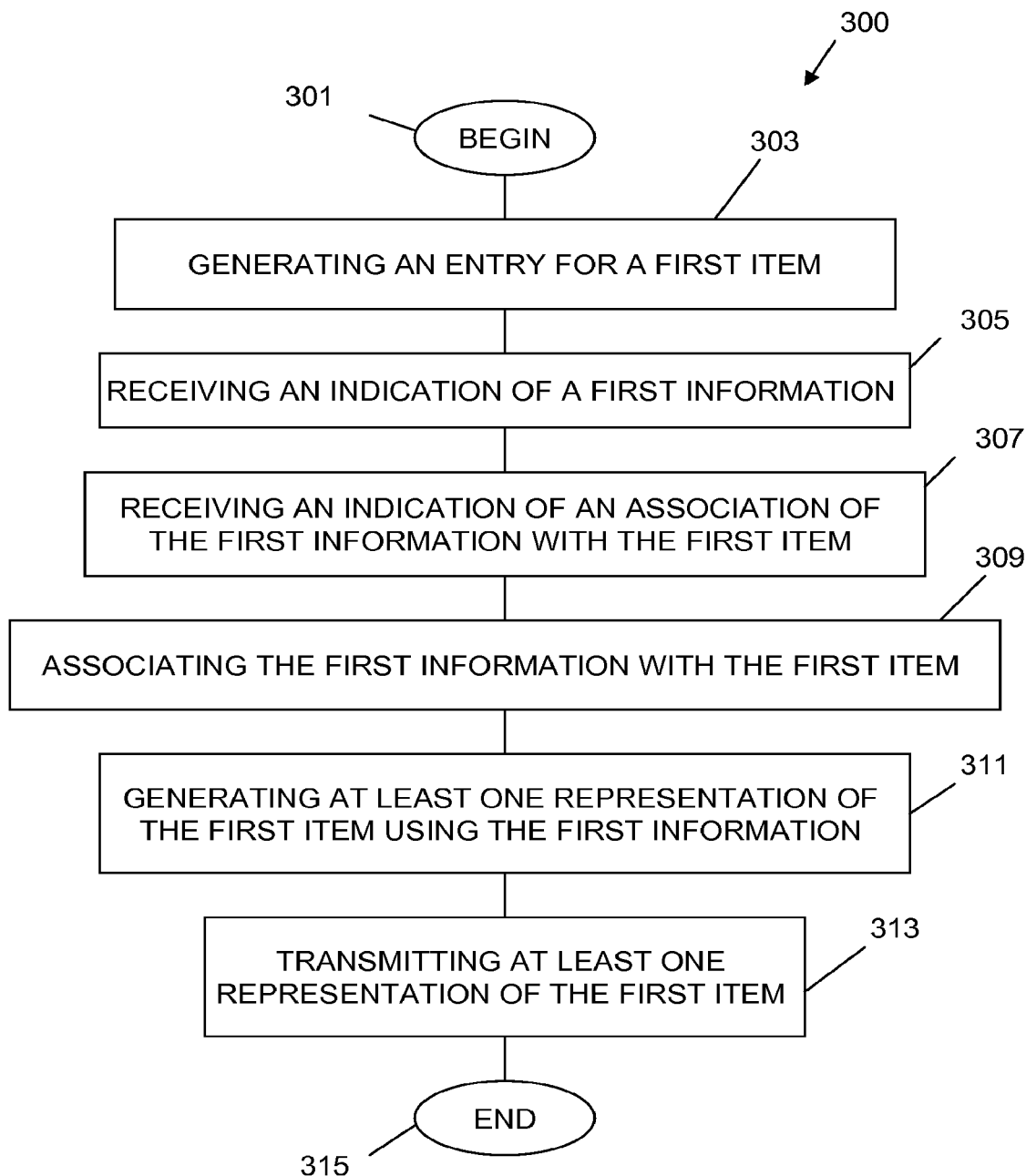
FIG. 3 shows an example process that may be performed by some embodiments of the present invention.

FIG. 3 illustrates an example process 300 according to one embodiment of the present invention that begins at block 301. Process 300 may be performed, for example, by one or more computer system.

As indicated at block 303, process 300 may include generating an entry for a first item. In some embodiments, the first item may include a listing of products and/or services available from a merchant. For example, in some implementations such a listing may include a menu for a particular restaurant, for example. In some embodiments, the entry may include a database entry, such as an entry into database table 201, described above. The entry may initially include default values for each element of the database table. Such default values may include default content and/or blank values. In some implementations, the entry may be generated in response to input from a source of information. The input may include, for example, a request to create the entry, an indication of an identifier for the entry, an indication of initial values for some or all of the elements of the entry, and/or any other desired information. In some implementations, such input may be received in the form of one or more electronic message.

In some implementations, the entry may be generated in response to a request received from a merchant or other person or entity associated with the entry. In some implementations, such a merchant may be asked to create a login to identify herself to a computer system implementing such a process, as is well known in the art. In other implementations, such a request may be received from another source. In still other implementations, the entry may be generated in response to some other identification of the existence of the merchant, such as input from a phone book or other catalogue of information.

As indicated at block 305, process 300 may include receiving an indication of a first piece of information. The first piece of information, in some implementation, may include information relevant to a listing of products and/or services available from a merchant. For example, in some implementations, the information may include a name of a merchant (e.g., a restaurant), a name of an available item (e.g., a food or drink item), a portion of or a full description of a merchant and/or item, an image, hours related to a merchants operation, delivery boundary information, and/or any information related to a merchant or item offered by a merchant (e.g., a product or service). In some implementations, the information may include sets of available products and/or services, for example, a particular set of standard Mexican food, a set of standard Italian food, a set of standard soft drinks (e.g., Coca-Cola products). In some implementations, the indication may be received as one or more electronic messages.

In some implementations, the indication of the first information may be received from a merchant or other person or entity associated with the information. In some implementations, before submitting information, the merchant may be asked to identify herself to a computer system by entering login information, as is known in the art.

In some implementations, the first information may be received from any other source. By allowing other sources to submit such information, responsibility for generating representations of information may be distributed to approved individuals and/or the public at large. Some implementations may ask such other sources to identify themselves through a login method, as is known in the art. In some implementations different abilities may be granted to a user based on whether a user decides to login to identify herself or to act anonymously without logging in. For example, in some implementations, new information may be added as trial information if entered anonymously and not given full entry status until approved by an administrator, the merchant, a user that logs in, or some other desired individual.

As indicated at block 307, some embodiments of process 300 may include receiving an indication of an association of the first information with the first item. An indication of an association may take any form, including a direct indication that the information and the item should be associated, an indication that the item and information should be associated to a same category, an indication that a default value should be used with the item and that the information should be used as a default value, a specific selection of the information for use with the item, and/or any other desired form from which an indication that the information and the item should be associated may be derived.

In some implementations, for example, when the information is received, the information may be associated with a category. For example, a category may include a type of a restaurant, a type of a merchant, etc. In some implementations, categories may be divided into any number of hierarchical subcategories and the information may be associated with a subcategory rather than a root main category. In some implementation association with subcategories may be carry inheritance characteristics so that association with a subcategory includes association with each higher level category.

The association with information and category may be performed in response to a separate request or as part of the receipt of the information. For example, a single electronic message may be submitted to indicate the information and a category. In other implementations separate messages from separate or the same source may indicate the information and the association. In some implementations, a user interface, such as a website, may allow users to enter information and/or associations and/or make selections of information and/or associations. In still other implementations categories and subcategories may not be used at all. In still other implementations categories and subcategories may be based on tags submitted by originators or later users of information and may alter as future tags are submitted (e.g., though a user interface).

In some implementations to facilitate matching of categorize of information with categories of items, items may be categorized into categories and/or subcategories that correspond to the categorizes and/or subcategories that the information may be associated with. By associating an item with a category and/or subcategory that information is associated with the item may thereby be associated with the information as well. In some implementations, an association of an item with a category and/or subcategory may be made in response to a request from the merchant, an administrator, member of the public, and/or any other desired individual. In some implementations, the information itself may include a request to make the association of the item with a category. Categories may be selected through a user interface, in some implementations. In some implementations such a request may include an indication of one or more tags to be associated with the item. In some implementations, categories with which information or items are associated with may change as tags or other indications indicate such changes.

In other embodiments, in addition to or instead of categories and subcategories, an indication of an association may take the form of a selection of particular information. Such selection may be facilitated through one or more user interfaces. For example, in one implementation, a website may provide a menu from which the information may be selected from among a plurality of possible information choices (e.g., the information in an information database table, as described above). A user of the interface may select (e.g. by clicking on the information with a mouse) the information and an electronic message identifying that selection may be transmitted to a computer system to indicate the selection of the association.

In still other embodiments, information may be associated with a default value. For example, a default value of a type of information entry for all items and/or a default value of content for items. In some such embodiments, the default values may be used in situation in which no other association or entry of information for a particular information item has been made. In some implementations, a receipt of an indication of an association may include not receiving information associating the item and any other information.

It should be understood that the above described implementations are provided as examples only and that indications of an association may take any form. It should further be understood that any combination of the above implementations and/or any other desired implementation may be performed in embodiments of the present invention. For example, a default value of a particular content for an item in a particular category may be used unless some other value from a selection of possible selection in that category is chosen by a user and submitted to a computer system implementing some embodiments of the present invention.

As indicated at block 309, some embodiments of process 300 may include associating the first information with the first item. Such association may occur, for example, through one or more database tables. Associating items trough database tables is well known in the art.

As indicated at block 311, some embodiments of process 300 may include generating at least one representation of the first item using the first information. In some implementations, the representation may include a user interface, such as a website and/or a mobile device interface. Such a user interface may include a listing products and or services available from a merchant, such as a menu of food items available from a restaurant. In some implementations, such a representation may include an interactive interface through which a user may select items for delivery. Such interactive delivery interfaces are known in the art.

In some implementations, the at least one representation may be generated in accordance with one or more user interface templates. For example, a template may indicate a layout of content information and the content information may be entered into the layout to produce the representation. In some implementations, such an interface template may take the form of one or more XML documents.

As indicated at block 313, some embodiments of process 300 may include transmitting the at least one representation of the first item. The representation may be transmitted for example over a communication network such as the internet. In some implementations the transmission may be received by a user of a computer system and displayed through the computer system (e.g., through a web browser or mobile device display).

Process 300 may end as indicated at block 315. As indicated by dashed lines in FIG. 3, some embodiments, may include receiving further indications of information and associations and making associations with the information. In some implementations, new association may replace old associations, while in other applications associations may cumulate. In some implementations, an indication of an association may indicate whether an association should cumulate or replace a prior association. Later generated and/or transmitted representations may incorporate later changed associations and/or information.

Figure 4:
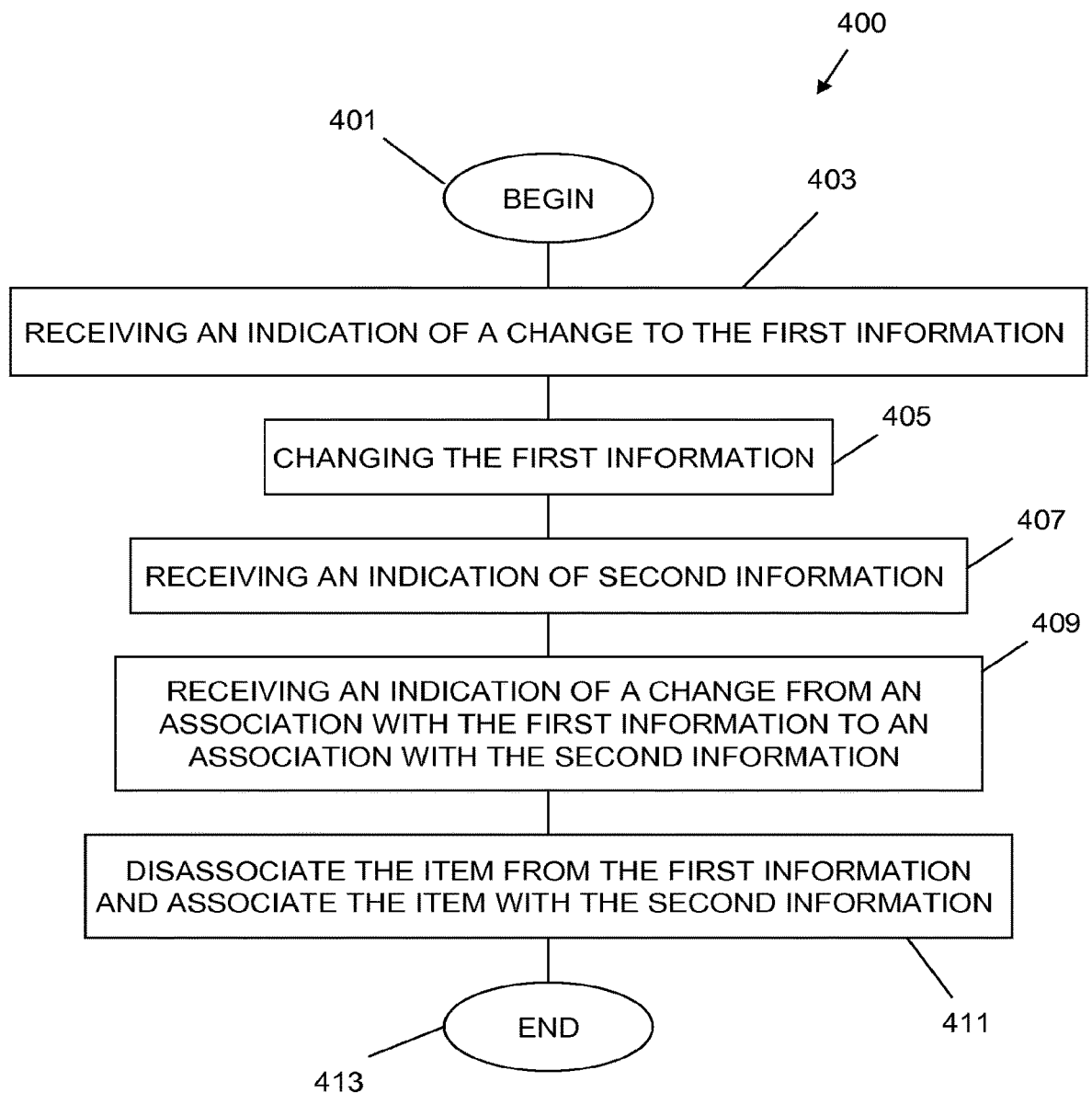
FIG. 4 shows an example process that may be performed by some embodiments of the present invention.

FIG. 4 illustrates a process 400 that may be used to change associations and/or information in accordance with some embodiments of the present invention. Process 400 may be performed, for example, by a computer system and may begin at block 401.

As indicated at block 403, process 400 may include receiving an indication of a change to the first information. The indication of the change may include an edit to the information. For example such an edit may include an electronic message indicating that a portion of a textual description should be modified (e.g., to improve the description). By allowing such changes, some embodiments allow a plurality of users to collaborate to generate information and edits to the information so that the information is accurate in the opinions of a large number of people as those opinions and underlying acts change.

In some implementations, before an individual may edit information a user may be asked to login to a computer system, as is known in the art. In some implementations, if a user does not login, edits to information submitted by the user may be flagged or otherwise treated as trial information and may not be fully entered unless approved by some other user, as discussed above.

In some implementations, as indicated at block 405, process 400 may include changing the first information. Such change may include incorporating the indicated changes of block 403. For example, a stored description in a database table may be edited to reflect a change to the description that makes the description more accurate.

In some implementations an edit to information may affect a plurality of items. For example, as described above, this may occur if pointers from a plurality of items point to a single piece of information that is subsequently edited. In other implementations, each item may point to a unique copy of information so that an edit to information may only affect the single item, as described above.

In some embodiments, as indicated at block 407, process 400 may include receiving an indication of second information. Receiving such second information may be substantially similar to receiving the first information, as described above. A plurality of pieces of information may be received in such fashion. For example, a plurality of pieces of information may include a plurality of different descriptions, images, or other information as described above with respect to the first information. The information may be stored in one or more database tables, as described above. Such plurality of pieces of information may make up a selection of possible information displayed to a user to allow selection of information for association with an item through a user interface. Such a selection of information may be displayed to a user (e.g., through a website) when a user creates an initial entry and/or edits information and/or associations related to an existing entry.

In some embodiments, as indicated at block 409, process 400 may include receiving an indication of a change from an association with the first information to an association with the second information. Such an indication may be substantially similar to an indication of the first association. In response to receiving that indication, a computer system may disassociate the item from the first information and associate the item with the second information (e.g., through a database table) as indicated at block 411, and process 400 may end at block 413

Specific Example in the Delivery Domain

Some embodiments may include a website for providing information about restaurants, including menu information to potential customers of those restaurants. In some implementations, the website may provide delivery opportunities for some or all of the restaurants. The website may allow users to edit information and associations of information with menus.

In such embodiments, information identifying a restaurant's existence may be received by a computer system (e.g., from a customer of the restaurant, the owner of the restaurant, anyone else), and a data base entry may be made accordingly. Such information may be submitted through a web-based user interface, as is well known in the art. The web-based interface may allow selection of information that has previously been submitted (e.g., information stored in an information database table).

Further information may be received about the restaurant, another restaurant, or restaurants in general. For example, such information may include descriptions, images, generic food packages (e.g., a set of Mexican food, a set of soft drinks offered, etc.) and/or any other desired information. The information may be received from the restaurant, a customer of the restaurant, and/or any other desired individual. The information may be submitted through a web-based user interface, as is well known in the art.

In some implementations, an indication of an association of the information with the restaurant may be received. Such an association may indicate, for example, that a particular restaurant should be associated with a certain set of hours, a certain set of Mexican food, a set of delivery boundary streets, etc. Such an association may then be made through one or more database tables. The indication of the association may be submitted through a web-site interface, such as one that allows a user to select information to be associated out of a list of possible information.

Future users of the website may edit the information and associations to update or otherwise change the information associated with a particular restaurant. Such users may, for example use a web-based user interface to submit edits to information and/or new associations.

Users may also request representations of the menu of the restaurant through a web-based interface. The menu may be presented incorporating all the associated up to date information submitted by various users. It should be recognized that although this specific example describes an embodiment in the delivery restaurant domain, the present invention is not so limited. Rather embodiments of the invention include any items, information, and associations.

More Embodiments

A method comprising receiving a representation of first information for a first menu; receiving an indication of an association of the first information with a second menu; associating the second menu with the first information, at least in part, in response to receiving the indication of the association; and transmitting a representation of the second menu, the representation of the second menu including the first information.

The method of paragraph 102, wherein the indication of the association includes a selection of the association.

The method of paragraph 102, wherein the indication of the association includes a selection of at least one of a type and a category.

The method of paragraph 104, wherein associating the second menu with the first information includes associating the second menu with the at least one of the type and the category.

The method of paragraph 102, wherein the first information includes at least one of product information, service information, merchant information, delivery information, and payment information.

The method of paragraph 106, wherein the first information includes the delivery information, and the delivery information includes at least one of a delivery boundary, a delivery availability, a delivery method, a delivery restriction, and a delivery time.

The method of paragraph 106, wherein the first information includes the payment information, and the payment information includes at least one of a type of payment accepted, a minimum payment accepted, and a method of making a payment.

The method of paragraph 106, wherein the first information includes the product information, and the product information includes at least one of a name, a category, a description, an image, an availability, and a price.

The method of paragraph 106, wherein the first information includes the service information, and the service information includes at least one of a name, a category, a description, an image, an availability, and a price.

The method of paragraph 106, wherein the first information includes the merchant information, and the merchant information includes at least one of a name, an image, a location, a category, operation hours, and a price.

The method of paragraph 102, wherein the first information includes at least one of textual information and graphical information.

An apparatus comprising a machine readable medium having stored thereon a plurality of machine instructions for controlling at least one computer system to perform a method according to paragraph 102.

The apparatus of paragraph 113, further comprising a processor configured to execute at least one instruction of the plurality of machine instructions.

A method comprising receiving at least one first indication, the at least one first indication indicating at least one first association of first information with a plurality of menus; and associating the plurality of menus with the first information, at least in part, in response to receiving the at least one first indication.

The method of paragraph 115, wherein the first information includes at least one of product information, service information, merchant information, delivery information, and payment information.

The method of paragraph 116, wherein the first information includes the delivery information, and the delivery information includes at least one of a delivery boundary, a delivery availability, a delivery method, a delivery restriction, and a delivery time.

The method of paragraph 116, wherein the first information includes the payment information, and the payment information includes at least one of a type of payment accepted, a minimum payment accepted, and a method of making a payment.

The method of paragraph 116, wherein the first information includes the product information, and the product information includes at least one of a name, a category, a description, an image, an availability, and a price.

The method of paragraph 116, wherein the first information includes the service information, and the service information includes at least one of a name, a category, a description, an image, an availability, and a price.

The method of paragraph 116, wherein the first information includes the merchant information, and the merchant information includes at least one of a name, an image, a location, a category, operation hours, and a price.

The method of paragraph 115, wherein the first information includes at least one of textual information and graphical information.

The method of paragraph 115, wherein the at least one first indication includes a plurality of first indications, each first indication of the plurality of first indications indicating the association of the first information with a respective one of the plurality of menus.

The method of paragraph 115, wherein the at least one first indication includes at least one indication of a category.

The method of paragraph 124, wherein each menu of the plurality of menus includes at least one item associated with the category.

The method of paragraph 125, wherein associating the plurality of menus with the first information includes associating the first information with the category.

The method of paragraph 124, further comprising receiving at least one second indication of at least one second association of at least one item of each menu of the plurality of menus with the category.

The method of paragraph 115, further comprising generating at least one representation of at least one menu of the plurality of menus, wherein the at least one representation includes the first information.

The method of paragraph 115, further comprising receiving at least one second indication, the at least one second indication indicating at least one second association of second information with the plurality of menus; and associating the plurality of menus with the second information, at least in part, in response to receiving the at least one second indication.

The method of paragraph 129, wherein associating the plurality of menus with the second information includes disassociating the plurality of menus with the first information.

The method of paragraph 129, wherein the second information includes at least one change to the first information.

An apparatus comprising: a machine readable medium having stored thereon a plurality of machine instructions for controlling at least one computer system to perform a method according to paragraph 115.

The apparatus of paragraph 132, further comprising a processor configured to execute at least one instruction of the plurality of machine instructions.

A method comprising receiving a first representation of first information about at least one of a first group comprising a first product, a first service, and a first merchant; and associating at least one of a second group comprising a second product, a second service, and a second merchant with the first information.

The method of paragraph 134, further comprising receiving a first indication indicating an association of the first information with the at least one of the second group, and wherein associating the at least one of the second group with the first information includes associating the at least one of the second group with the first information, at least in part, in response to receiving the first indication.

The method of paragraph 134, wherein the first product includes the second product, the first service includes the second service, and the first merchant includes the second merchant.

The method of paragraph 134, wherein the first information includes at least one of textual information and graphical information.

The method of paragraph 134, wherein associating the at least one of the second group with the first information includes providing a default value for at least one menu item.

The method of paragraph 134, further comprising storing the first information in at least one first collection of information; and searching the at least one first collection of information for the first information before associating the at least one of the second group with the first information.

The method of paragraph 134, further comprising receiving a second representation of second information about the at least one of the first group; and associating the at least one of the second group with the second information.

The method of paragraph 140, wherein the second information includes a change to the first information.

The method of paragraph 140, wherein associating the at least one of the second group with the second information includes disassociating the at least one of the second group with the first information.

An apparatus comprising a machine readable medium having stored thereon a plurality of machine instructions for controlling at least one computer system to perform a method according to paragraph 134.

The apparatus of paragraph 143, further comprising a processor configured to execute at least one instruction of the plurality of machine instructions.

A method comprising receiving first information; and associating at least a portion of the first information with at least one of the group comprising a plurality of products, a plurality of services, and a plurality of merchants.

The method of paragraph 145, wherein the first information includes at least one of textual information and graphical information.

The method of paragraph 145, wherein the first information includes at least one of product information, service information, merchant information, delivery information, and payment information.

The method of paragraph 147, wherein the first information includes the delivery information, and the delivery information includes at least one of a delivery boundary, a delivery availability, a delivery method, a delivery restriction, and a delivery time.

The method of paragraph 147, wherein the first information includes the payment information, and the payment information includes at least one of a type of payment accepted, a minimum payment accepted, and method of making a payment.

The method of paragraph 147, wherein the first information includes the product information, and the product information includes at least one of a name, a category, a description, an image, an availability, and a price.

The method of paragraph 147, wherein the first information includes the service information, and the service information includes at least one of a name, a category, a description, an availability, and a price.

The method of paragraph 147, wherein the first information includes the merchant information, and the merchant information includes at least one of a name, an image, a location, a category, operation hours, and a price.

The method of paragraph 145, further comprising receiving at least one indication indicating at least one association of the first information with the at least one of the group.

The method of paragraph 153, wherein the at least one indication includes a plurality of indications, each indication of the plurality of indication indicating an association of the first information with a respective at least one of a product, a service and a merchant of the at least one group.

The method of paragraph 153, wherein the at least one indication includes an indication of at least of a category and a type.

The method of paragraph 145, further comprising providing at least one representation of at least one menu associated with at least one of a product, a service, and a merchant of the at least one group, wherein the at least one menu includes the at least the portion of the first information.

The method of paragraph 145, further comprising: receiving second information; and associating at least a portion of the second information with the at least one of the group.

The method of paragraph 157, wherein associating the at least the portion of the second information with the at least one of the group includes disassociating the at least the portion of the first information with the at least one of the group.

The method of paragraph 157, wherein the second information includes at least one change to the first information.

The method of paragraph 145, wherein associating the at least the portion of the first information with the at least one of the group includes using the at least the portion of the first information as a default menu value for the at least one of the group.

An apparatus comprising a machine readable medium having stored thereon a plurality of machine instructions for controlling at least one computer system to perform a method according to paragraph 145.

The apparatus of paragraph 161, further comprising a processor configured to execute at least one instruction of the plurality of machine instructions.

A method comprising receiving first information about at least one category; assigning at least one of a group comprising a plurality of products, a plurality of merchants, and a plurality of services to the at least one category; and associating at least one member of the at least one category with the first information.

The method of paragraph 163, wherein the first information includes at least one of textual information and graphical information.

The method of paragraph 163, wherein the first information includes at least one of product information, service information, merchant information, delivery information, and payment information.

The method of paragraph 163, further comprising receiving at least one indication indicating at least one association of the first information with the at least one category.

The method of paragraph 163, further comprising receiving at least one indication indicating at least one association of the group with the at least one category.

The method of paragraph 163, further comprising providing at least one representation of at least one menu associated with at least one of a product, a service, and a merchant of the group, wherein the at least one menu includes the information.

The method of paragraph 163, further comprising receiving second information about the at least one category; and associating the at least one member of the at least one category with the second information.

The method of paragraph 169, wherein associating the at least one member of the at least one category with the second information includes disassociating the at least one member of the at least one category with the first information.

The method of paragraph 169, wherein the second information includes at least one change to the first information.

The method of paragraph 163, wherein associating the at least one member of the at least one category with the first information includes using the first information as a default menu value for the at least one member.

An apparatus comprising a machine readable medium having stored thereon a plurality of machine instructions for controlling at least one computer system to perform a method according to paragraph 163.

The apparatus of paragraph 173, further comprising a processor configured to execute at least one instruction of the plurality of machine instructions.

The invention claimed is:

1. An apparatus comprising:
at least one processor configured to control:
generating first listing information for a first merchant based on item information received, over a communication network, from the first merchant;
in response to receiving the item information, associating the first listing information with a first listing of items of the first merchant;
transmitting a first representation of the first listing of items that includes the first listing information over the communication network to a first computing device of a first user of a referral or delivery service;
receiving, over the communication network, from the first computing device of the first user of the referral or delivery service, an indication to associate the first listing information with a second listing of items of a second merchant;
in response to receiving the indication, associating the first listing information with the second listing of items;
receiving an edit to the first listing information from a second computing device of a second user of the referral or delivery service, wherein the edit is a change to the first listing information;
in response to receiving the edit, adjusting the first listing information to include the edit in the first listing of items and maintain the first listing information without the edit in the second listing of items;
transmitting a second representation of the first listing of items that includes the first listing information and the edit over the communication network to a third computing device of a third user of the referral or delivery service after receiving the edit; and
receiving, from the third computing device over the communication network, a selection by the third user of selected items from the first listing of items for delivery from the first merchant;
wherein the third user is not any of the first user and the second user, and each of the first user and the second user includes a customer of the referral or delivery service.

2. The apparatus of claim 1, wherein the at least one processor is configured to control:
facilitating delivery of the selected items from the first merchant to the third user.

3. The apparatus of claim 1, wherein the at least one processor is configured to control:
receiving an indication of a category for the first merchant;
in which receiving the first listing information includes receiving listing information to be associated with merchants in the category; and in which the indication that the first listing information is associated with the second listing of items indicates the second merchant is in the category.

4. The apparatus of claim 1, in which the edit includes at least one of a name, a category, a description, an image, an availability, or a price.

5. The apparatus of claim 1, in which the edit includes at least one of an augmentation of the first listing information, a modification to the first listing information, a change to the first listing information, or an addition to the first listing information.

6. The apparatus of claim 1, in which the first listing information includes at least one of product information, service information, merchant information, delivery information, or payment information.

7. The apparatus of claim 1, in which the first merchant includes a restaurant and the first and second listing information include food items.

8. A method comprising:
controlling, by at least one processor:
generating first listing information for a first merchant based on item information received, over a communication network, from the first merchant;
in response to receiving the item information, associating the first listing information with a first listing of items of the first merchant;
transmitting a first representation of the first listing of items that includes the first listing information over the communication network to a first computing device of a first user of a referral or delivery service;
receiving over the communication network, from the first computing device of the first user of the referral or delivery service, an indication that the first listing information is associated with a second listing of items of a second merchant;
in response to receiving the indication, associating the first listing information with the second listing of items;
receiving an edit to the first listing information from a second computing device of a second user of the referral or delivery service, wherein the edit is a change to the first listing information;
in response to receiving the edit, adjusting the first listing information to include the edit in the first listing of items and maintain the first listing information without the edit in the second listing of items;
transmitting a second representation of the first listing of items that includes the first listing information and the edit over the communication network to a third computing device of a third user of the referral or delivery service after receiving the edit; and
receiving, from the third computing device over the communication network, a selection by the third user of selected items from the first listing of items for delivery from the first merchant;
wherein the third user is not any of the first user and the second user, and each of the first user and the second user includes a customer of the referral or delivery service.

9. The method of claim 8, further comprising controlling, by the at least one processor, facilitating delivery of the selected items from the first merchant to the third user.

10. The method of claim 8, further comprising controlling, by the at least one processor, receiving an indication of a category for the first merchant; in which receiving the first listing information includes receiving listing information to be associated with merchants in the category; and in which the indication that the first listing information is associated with the second listing of items indicates the second merchant is in the category.

11. The method of claim 8, in which the first merchant includes a restaurant and the first and second listing information include food items.

12. The method of claim 8, in which the edit includes at least one of a name, a category, a description, an image, an availability, or a price.

13. The method of claim 8, in which the edit includes at least one of an augmentation of the first listing information, a modification to the first listing information, a change to the first listing information, or an addition to the first listing information.

14. The method of claim 8, in which the first listing information includes at least one of product information, service information, merchant information, delivery information, or payment information.

* * * * *